United States Patent
Beck

(10) Patent No.: US 6,206,342 B1
(45) Date of Patent: Mar. 27, 2001

(54) SEAT VALVE HAVING ROTATING CLOSURE MEMBER FOR VARIABLE PRESSURE CONTROL

(75) Inventor: Erhard Beck, Weilburg (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/155,521

(22) PCT Filed: Apr. 7, 1997

(86) PCT No.: PCT/EP97/01728

§ 371 Date: Jun. 22, 1999

§ 102(e) Date: Jun. 22, 1999

(87) PCT Pub. No.: WO97/38885

PCT Pub. Date: Oct. 23, 1997

(30) Foreign Application Priority Data

Apr. 13, 1996 (DE) ............................................. 196 14 631

(51) Int. Cl.$^7$ ......................... F16K 31/02; F16K 31/00; F17D 31/00
(52) U.S. Cl. ............... 251/129.11; 251/120; 251/129.01; 137/625.17; 137/625.12
(58) Field of Search ............................. 251/120, 121.11, 251/129.01, 129.05; 137/614.11, 624.13, 624.14, 625.17

(56) References Cited

U.S. PATENT DOCUMENTS 3,206,160   9/1965  Bennett .
3,372,371 * 3/1968  Lesser et al. .................... 137/625.17
5,207,410 * 5/1993  Wakeman ........................ 251/129.15
5,356,112 * 10/1994 Simar et al. .................... 251/129.11
5,381,829 * 1/1995  Adahan .......................... 137/625.17

FOREIGN PATENT DOCUMENTS 3102232   11/1981  (DE) .
4030571   4/1992   (DE) .
4314581   11/1994  (DE) .
0713813   5/1996   (EP) .

* cited by examiner

Primary Examiner—Kevin Shaver
Assistant Examiner—David A. Bonderer
(74) Attorney, Agent, or Firm—Rader, Fishman & Grauer PLLC

(57) ABSTRACT

A seat valve for controlling pneumatic or hydraulic pressure between at least two pressure fluid channels (8, 8') includes a valve closure member (5) connected to a magnetic armature (4), a spring for the basic positioning of the valve closure member (5) in relation to a valve seat (7) in the valve housing (6), a magnetic core and a valve coil for the translatory movement of the magnetic armature (4). A control channel (1), a tappet (2), a sleeve (2'), a rotating field winding (3), and an opening 3') are provided to produce a rotary movement of the magnetic armature (4) and to transmit the rotary movement to the valve closure member (5) for the variable control of a pressure fluid passage.

4 Claims, 1 Drawing Sheet

SEAT VALVE HAVING ROTATING CLOSURE MEMBER FOR VARIABLE PRESSURE CONTROL

BACKGROUND OF THE INVENTION

The present invention relates to a seat valve for the control of pneumatic or hydraulic pressure between at least two pressure fluid channels.

German patent application No. 40 30 571 discloses an electromagnetic seat valve, closed in its de-energized condition, for the control of hydraulic pressure, which includes a magnetic armature to which a valve closure member is attached, and a spring that urges a valve closure member against a valve seat by a defined preload. The valve seat is mounted in the valve housing. Further, a magnetic core is accommodated in a thin-walled valve sleeve and a valve coil is secured to the valve sleeve. The winding of the valve coil is configured so that the magnetic armature performs exclusively a translatory movement so that the valve closure member is either opened or closed stroke-responsively as a function of the electromagnetic energization of the valve coil. This produces a binary switching behavior with relatively quick stroke movements. However, a variable adjustment of the rate of fluid flow is not permitted thereby.

An object of the present invention is to improve a seat valve of the type mentioned hereinabove by simple and functionally reliable means to such effect that in addition to the actual translatory movement of the valve closure member the rate of fluid flow can be adjusted variably with minimum possible electric energy demand.

SUMMARY OF THE INVENTION

According to the present invention, this object is achieved for a seat valve of the generic type by producing a rotary movement of the magnetic armature and transmitting the rotary movement to the valve closure member for a variable control of a pressure fluid passage.

Further features, advantages and possible applications of the present invention can be seen in the following in the description of two embodiments.

DETAILED DESCRIPTION OF THE DRAWINGS

Figure 1:
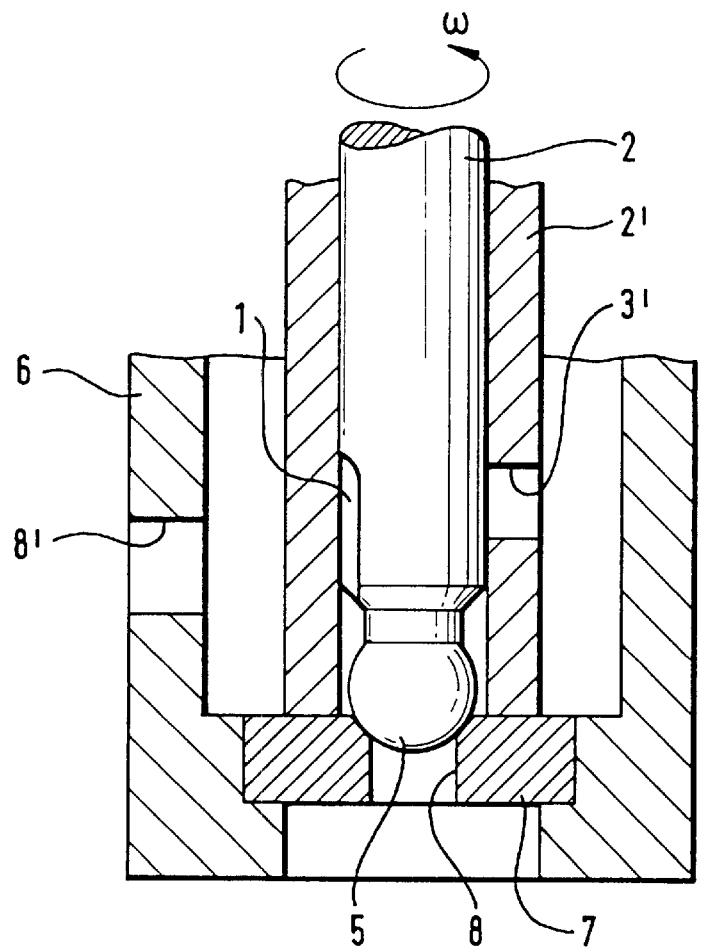
FIG. 1 is an expedient construction of the basic elements of the object of the present invention.

The FIG. 1 embodiment shows an enlarged partial view of a normally closed seat valve for the control of pneumatic or hydraulic pressure. The seat valve has a substantially spherical valve closure member 5 which, in the initial position shown in the drawing, moves into sealing abutment on a generally plate-shaped valve seat 7. Succeeding the valve closure member 5 is a tapering transition area to a tappet 2, and the tappet 2 is sealed within a sleeve 2' so that leakage is prevented. The wall of sleeve 2' has an opening 3' which (as shown) is covered by the stem of tappet 2 in a pressure-fluid tight manner. On the stem portion of the tappet 2 remote from the opening 3', there is a control channel 1, acting as a control groove, which can be moved to overlap opening 3' by rotation of the tappet 2. Opening 3' is connected to a pressure fluid channel 8' by way of an annular chamber in a valve housing 6. A pressure fluid channel 8 connected downstream of the valve closure member 5 in the drawing is isolated from the pressure fluid channel 8' due to the closed position of the valve closure member 5 and due to the stem portion of tappet 2 which closes the opening 3'. FIG. 1 relates exclusively to the basic construction elements in the area of the valve closure member 5, without discussing possible details of the design. Thus, FIG. 1 can be considered as a block diagram of the present invention. Although the valve portion adjacent to tappet 2 is not shown, basically, one has to expect a seat valve design as disclosed in German patent application No. 40 30 571, wherein adjoining the tappet 2 is a magnetic armature 4 in a closed valve housing 6 which is encompassed by a valve coil that generates the magnetic armature stroke.

Figure 2:
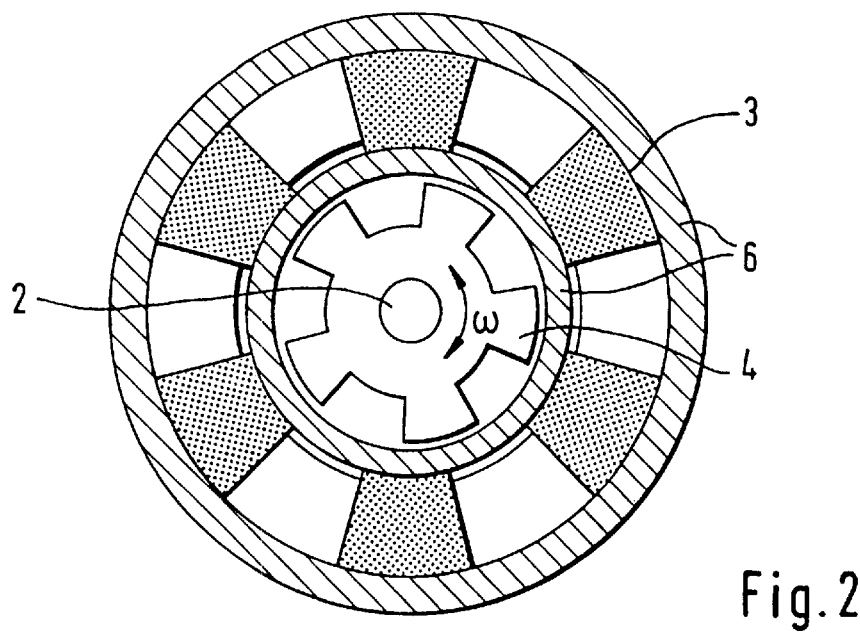
FIG. 2 is a top view of a rotating field winding and a magnetic armature for use in the present invention.

Further details of the design of the magnetic armature 4 and the coil winding according to the present invention can be taken from the FIG. 2 embodiment hereinbelow. FIG. 2 shows a top view of the magnetic armature 4 which generally has a star-like configuration in its cross-sectional profile. Armature 4 is movable both translatorily and rotatorily inside the valve housing 6. The sleeve-shaped valve housing 6 which is shaded in the area of the magnetic armature 4 accommodates on its outside wall a rotating field winding 3 which, depending upon the electric energization and, thus, variation of the rotating field, rotates the magnetic armature 4 by a defined angle. This also causes the control groove (control channel 1) on the tappet 2 to more or less move to overlap with the opening 3' so that the pressure fluid passage between the two pressure fluid channels 8, 8' can be varied when the valve closure member 5 is open. The mode of operation may be identical with the operating principle of a reluctance motor, wherein upon generation of a rotating field in the rotating field winding 3 the magnetic armature 4 and, thus, the tappet 2 rotates with selectively adjustable rotating speeds. This permits varying at will the pressure fluid flow rate and, thus, the time interval during which the opening 3' and the channel 1 overlap each other. A reversal in the direction of rotation of the magnetic armature 4 is equally possible in a corresponding actuating process so that the armature may temporarily turn the tappet 2 to and fro in order to alternately overlap the opening 3'. The valve coil which is required for the stroke movement of the magnetic armature 4 can be structurally combined with the rotating field winding 3. The valve coil then includes two independently actuatable winding parts, one part being intended for closing and opening the valve, and the other part determining the rotating angle orientation of the magnetic armature 4.

The advantage of the object of the present invention is that both the effect of the rotating field and the translation of the magnetic armature are possible separately from each other as well as in superposition. This implies that the tappet 2 can rotate in the closed and the open condition, in order to pre-adjust a large or a small controlling cross-section between the opening 3' and the channel 1 as needed, or to vary the controlling cross-section alternatively during the stroke of the magnetic armature. The flow rate is thus controllable or adjustable in analog operation. Pressure variations of the fluid do not cause impairment of the necessary adjustment forces at the magnetic armature. The object of the present invention ensures an energetically favorable opening and closing of the valve with a correspondingly small air slot of the magnetic armature.

LIST OF REFERENCE NUMERALS 1 control channel
2 tappet

2' sleeve
3 rotating field winding
3' opening
4 magnetic armature
5 valve closure member
6 valve housing
7 valve seat
8,8' pressure fluid channels

What is claimed is:

1. A seat valve for controlling the pressure between at least two pressure fluid channels including a valve housing having a valve seat, a valve closure member connected to a magnetic armature, a spring for basic positioning of the valve closure member in relation to the valve seat in the valve housing, a magnetic core and a valve coil for translatory movement of the magnetic armature so as to move the closure member into and out of engagement with the valve seat, a tappet with a longitudinal control channel that connects the magnetic armature to the valve closure member, the valve closure member being guided in a sleeve which seals in-between the valve seat and the valve housing and includes an opening that radially penetrates the sleeve, the longitudinal control channel overlapping, at least in sections, the radial opening depending on the angular rotary position of the tappet, the magnetic core having a winding configured to generate a rotating magnetic field that embraces the magnetic armature for producing a rotary movement of the magnetic armature, the tappet transmitting the rotary movement to the valve closure member for variable control of a pressure fluid passage wherein the magnetic armature comprises a plurality of first poles, the magnetic core comprising a plurality of second poles.

2. The seat valve of claim 1 wherein the variable control occurs as a function of said overlapping with respect to time.

3. The seat valve of claim 1 wherein the rotary movement is produced according to a reluctance effect.

4. The seat valve of claim 3 wherein the variable control of the pressure fluid passage is determined as a function of an angular speed of rotation of the magnetic armature.

* * * * *